US007530580B2

(12) United States Patent
Holgesson

(10) Patent No.: US 7,530,580 B2
(45) Date of Patent: May 12, 2009

(54) TRANSPORT ASSEMBLY

(75) Inventor: Magnus Holgesson, Helsingborg (SE)

(73) Assignee: Schoeller Arca Systems AB, Perstorp (SE)

( * ) Notice: Subject to any disclaimer, the term of this patent is extended or adjusted under 35 U.S.C. 154(b) by 178 days.

(21) Appl. No.: 10/572,546

(22) PCT Filed: Sep. 16, 2004

(86) PCT No.: PCT/SE2004/001339

§ 371 (c)(1),
(2), (4) Date: Apr. 24, 2006

(87) PCT Pub. No.: WO2005/028276

PCT Pub. Date: Mar. 31, 2005

(65) Prior Publication Data

US 2006/0277867 A1  Dec. 14, 2006

(30) Foreign Application Priority Data

Sep. 19, 2003 (SE) .................................... 0302495

(51) Int. Cl.
*B62B 3/14* (2006.01)
(52) U.S. Cl. ...................... 280/79.11; 220/1.5; 220/4.27
(58) Field of Classification Search ............. 280/79.11, 280/79.2; 220/1.5, 4.27
See application file for complete search history.

(56) References Cited

U.S. PATENT DOCUMENTS

| 4,000,704 | A | * | 1/1977 | Griffin, Jr. ................ 108/53.1 |
| 5,186,330 | A | * | 2/1993 | McClure .................... 206/508 |
| 5,564,805 | A | * | 10/1996 | Dickinson ................ 312/249.8 |
| 5,829,595 | A | * | 11/1998 | Brown et al. .............. 206/600 |
| 5,865,315 | A | * | 2/1999 | Uitz .......................... 206/600 |

(Continued)

FOREIGN PATENT DOCUMENTS

EP  0856469  8/1998

(Continued)

*Primary Examiner*—Christopher P Ellis
*Assistant Examiner*—John D Walters
(74) *Attorney, Agent, or Firm*—Novak, Druce & Quigg LLP

(57) ABSTRACT

Transport assembly comprising a transportation means which comprises a pallet-like carrying structure with two long sides, two short sides, four corners, an upper surface and a lower surface. The carrying structure is provided with wheels at each of the four corners of which at least two of the wheels possibly are of the swivel castor wheel type. The upper surface is furthermore provided with receiving means which are intended to receive the wheels of a second transportation means stacked on top of a first transportation means so that a number of such transportation means may be stacked, and fixated horizontally, one on top of the other. The upper surface is provided with two narrow long side channels arranged parallel to the long sides and stretching from one short side to the other. The long side channels are placed at a distance from each other which is mainly equal to the distance between the wheels, as seen from a short side, wherein transportation means may be placed one on top of the other by rolling them into engagement with each other in a lengthways direction. The transport assembly further comprises a plurality of containers stacked on top of the transportation means and a lid applied on top of the stack of containers.

7 Claims, 2 Drawing Sheets

U.S. PATENT DOCUMENTS

Figure 1:
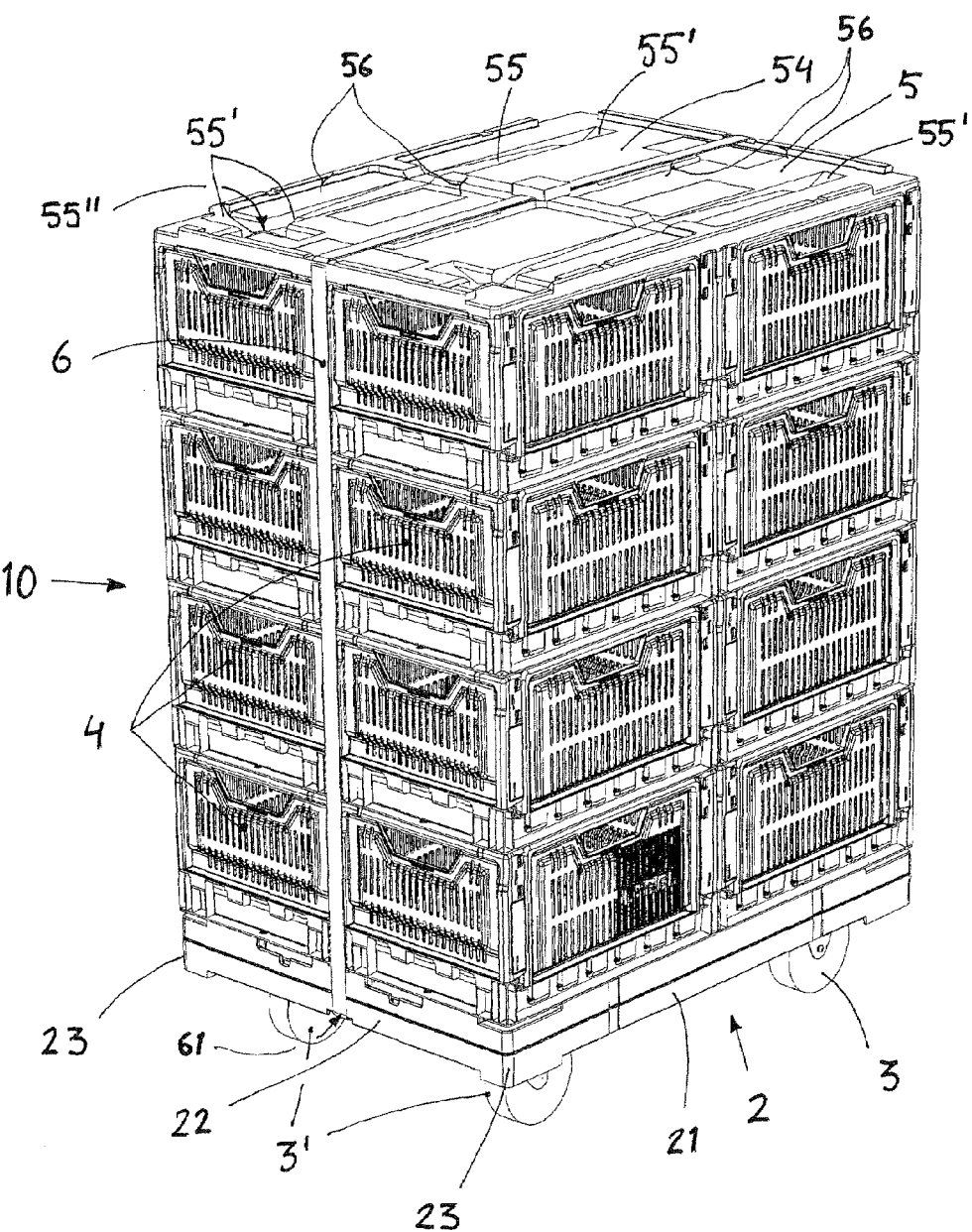

| | | | |
|---|---|---|---|
| 6,024,223 A * | 2/2000 | Ritter | 206/600 |
| 6,439,131 B1 * | 8/2002 | Higgins | 105/215.2 |
| 6,983,946 B2 * | 1/2006 | Sullivan et al. | 280/79.11 |
| 7,066,477 B2 * | 6/2006 | Dubois et al. | 280/79.11 |
| 2002/0124527 A1 | 9/2002 | Vafadari | |

FOREIGN PATENT DOCUMENTS

| | | | |
|---|---|---|---|
| JP | 07096943 A * | 4/1995 |
| WO | 0051898 | 9/2000 |

* cited by examiner

TRANSPORT ASSEMBLY

This application is a 35 USC § 371 U.S. National Stage Application of International Application No. PCT/SE2004/001339, filed on Sep. 16, 2004, claiming the priority of Swedish Patent Application No. 0302495-7, filed Sep. 19, 2003, the entire disclosures of which are incorporated herein by reference in their entireties.

The present invention relates to a transportation means comprising a pallet-like carrying structure provided with wheels a plurality of containers and a lid.

Transportation means consisting of a carrying structure provided with wheels on the lower side has been known for a long time. They are most often of a format adapted to containers used for transportation an storage of goods. Most common formats, as seen from above, are 0.4×0.6 meters and 0.6×0.8 meters. The transportation means do, of course, need to be transported empty from time to time. In order to do that, the transportation means need to be stacked on top of each other. Since they are provided with wheels they will roll around and a stack will be impossible to handle. There are a number of way to secure such a stack.

One known such way is to alternately turn the transportation means 90° so that they rest, not on their wheels, but on the carrying structure itself. In order to secure the stack, the carrying structure is provided with guiding means on the rim. This solution is known from GB 2 207 894. The disadvantage with this solution is that the stack will not be adapted to any pallet format standard. Such a stack will therefore be a bit bulky.

Another way to solve the problem is shown in GB 0 904 198 where the upper surface of the carrying structure is provided with small pockets which is intended to accommodate the wheels. The problems with this solution is that it is a bit difficult to position the transportation means exactly enough to make the wheels engage the pockets.

A slight improvement upon GB 0 904 198 is known from EP 0 675 829. The upper surface has here been provided with a bowl-like structure with a shape that corresponds to the radius of the swivel castor wheel as rotated around the swivelling axis. It will be a bit easier to position a transportation means according to EP 0 675 829 when compared to GB 0 904 198 but the design will allow some sideways movement which does not provide a perfect vertical alignment of the stack.

A variation of EP 0 675 829 which also gives some improvement upon the same is known from GB 2 281 897 where the bowl-like shapes known from EP 0 675 829 have been provided with sloping partition walls guiding the wheels into four narrow pockets. The disadvantage with this solution is that swivel castor wheels might be stuck on top of the partition wall. You will furthermore have to position the transportation means rather exactly in order to make it fall into the correct position.

All of the above transportation means suffer from the disadvantage that they have to be positioned onto one another by being lowered from above in a more or less vertically aligned position when being stacked. This works rather well, although it is time consuming, as long as the stack is relatively low. It will however be rather difficult to position the transportation means when the stack reaches shoulder height and above. This is specially pronounced when they are heavy. There is also an ergonomic aspect to the stacking since the transportation means will have to be lifted into engagement. Neck, back and shoulder problems are most likely to occur if this stacking operation is repeated for a longer period of time.

A transportation means which shows radical improvement on the ergonomic field is known from WO 00/51898.

The transportation means discussed above is most often used for transporting containers in short, controlled and closed loops like from a local bakery to a nearby supermarket. Such containers may be foldable such as the ones known from U.S. Pat. No. 6,029,840. It is not possible to use this type of transport system for a more open type of transport of security reasons since it is very easy to tamper with this type of package. This is a problem that needs to be solved.

According to the present invention a transport assembly which meets the requirement for a secure transport has been achieved. Accordingly, the invention relates to a transport assembly comprising a transportation means which comprises a pallet-like carrying structure. The pallet like carrying structure is provided with two long sides, two short sides, four corners, an upper surface and a lower surface. The carrying structure is also provided with wheels at each of the four corners of which at least two of the wheels possible are of the swivel castor wheel type. The upper surface is furthermore provided with receiving means which are intended to receive the wheels of a second transportation means stacked on top of a first transportation means so that a number of such transportation means may be stacked, and fixed horizontally, one on top of the other. Thus, the upper surface is provided with two narrow long side channels arranged parallel to the long sides and which are stretching from one short side to the other. The long side channels are placed at a distance from each other which is mainly equal to the distance between the wheels, as seen from a short side. The transportation means may be placed on top of the other by rolling them into engagement with each other in a lengthwise direction. The invention is characterized in that the transport assembly further comprises a plurality of containers stacked on top of the transportation means and a lid applied on top of the stack of containers. The containers are of a type known from U.S. Pat. No. 6,029,840.

The stack of containers and the lid is preferably secured to the transportation means by means of tensional straps. According to a preferred embodiment of the invention the transport assembly is secured from unauthorised tampering by means of providing the tensional strap with a seal. It is according to another embodiment of the invention possible to secure the transport assembly from unauthorised tampering by means of providing the transportation means, the containers and the lid with one or more seals. It is for example possible to use a tensional strap which is used only once and which will have the double function of tensional strap as well as a seal. The tensional strap suitably compises a strap and a tensioning devise. According to one embodiment the tensioning device is integrated in the transportation means. It is hereby possible to arrange it flush with the outer surfaces of the transportation means. The tensioning device will hereby be protected from being damaged during transport.

According to one embodiment of the invention the containers are provided with a base and four foldable side walls. It will hereby be possible to reduce the transport volume when shipping empty containers.

The lid is preferably provided with receiving means which are intended to receive the wheels of a second transportation means of a second transport assembly stacked on top of a first transportation means so that a plurality of such transport assemblies may be stacked, and fixated horizontally, one on top of the other. The upper surface of the lid is provided with two parallel narrow long side channels of the lid, stretching from one short side of the lid to the other. The long side channels of the lid are placed at a distance from each other which is mainly equal to the distance between the wheels, as seen from a short side. The transportation means may be placed on top of the lid by rolling it into engagement with the lid in a lengthways direction.

The long side channels of the lid are suitably also provided with channel stoppers of the lid placed at a distance from each of the short side ends of the long side channels of the lid, which distance is adapted to the radius of the wheels so that a wheel is prevented from moving inwards in the long side channel of the lid. Inner channel stoppers of the lid are suitably placed at a position corresponding to the vertical swivelling axis of the swivel castor wheels. The lid is suitably provided with protrusions intended to interact with upper side wall edges of the containers on its lower side. This interaction resulting in stabilising a stack of containers. This stabilising effect is specially noted when the base area of the containers are ½, ¼, etc. the area of the transportation means, meaning that the stack of containers consist of 2, 4 etc. towers of containers arranged close together. The lid will here keep the containers together.

According to a preferred embodiment of the invention a plurality of containers, in a collapsed state, at least one, possibly a plurality of lids and at least one possibly a plurality of transportation means are assembled as a unit kept together by means of the tensional straps during empty return transport of said containers.

The invention is explained further together with enclosed drawings, showing a preferred embodiment of the invention wherein, FIG. 1 shows, in perspective view, a preferred embodiment of a transport assembly 10 according to the invention.

Figure 2:
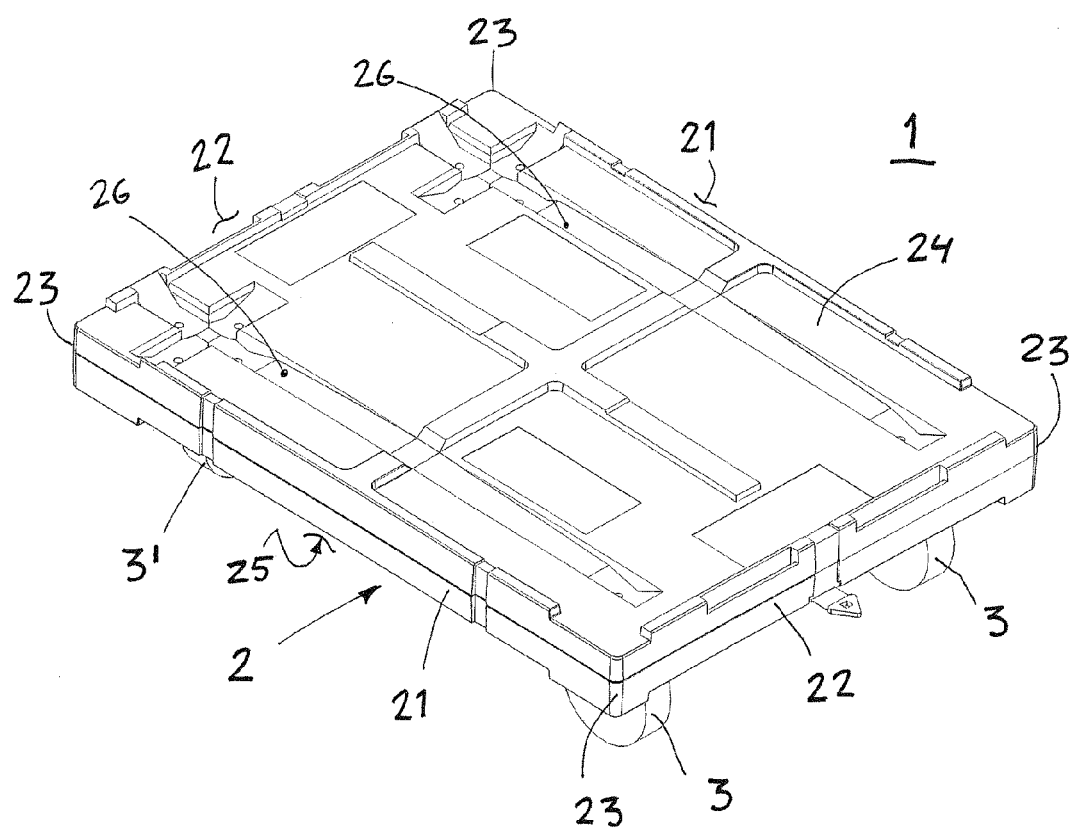

FIG. 2 shows, in perspective a transportation means 1 shown in FIG. 1.

Accordingly, FIG. 1 shows, in perspective view, a transport assembly 10 according to a preferred embodiment of the invention. The transport assembly 10 comprises a transportation means 1.

Referring now to FIG. 2. The transportation means 1 comprises a pallet-like carrying structure 2 with two long sides 21, two short sides 22, four corners 23, an upper surface 24 and a lower surface 25. The carrying structure is provided with wheels 3 at each of the four corners 23 of which two of the wheels 3 are of the swivel castor wheel type 3'. The upper surface 24 is furthermore is provided with receiving means which are intended to receive the wheels 3 of a second transportation means 1 stacked on top of a first transportation means 1 so that a number of such transportation means 1 may be stacked, and fixated horizontally, one on top of the other. The upper surface 24 is provided with two narrow long side channels 26 arranged parallel to the long sides 21. Accordingly, these long side channels 26 are stretching from one short side 22 to the other. The long side channels 26 are placed at a distance from each other which is mainly equal to the distance between the wheels 3, as seen from a short side 22. The transportation means 1 may thus be placed one on top of the other by rolling them into engagement with each other in a lengthways direction.

Referring now, again, to FIG. 1, The transport assembly 10 further comprises a plurality of containers 4 stacked on top of the transportation means 1 and a lid 5 applied on top of the stack of containers 4. Such containers 4 are known from U.S. Pat. No. 6,029,840. These containers 4 suitably has a horizontal dimension, a so-called foot-print, which is a multiple of the horizontal area of the transportation means 1. The foot-print area of the containers 4 may accordingly be ⅟₁, ½, ⅓, ¼, ⅙, ⅛ etc. of the base area of the transportation means 1. In one example the dimension of the transportation means 1 is 600×800 mm and the base dimension of the containers most commonly used hereon are 600×400 mm and 400×300 mm. The stack of containers 4 and the lid 5 is secured to the transportation means 1 by means of a tensional strap 6. The transport assembly 10 is secured from unauthorized tampering by means of providing the tensional strap 6 with a seal. The tensional strap 6 comprises a strap and a tensioning device 61. The tensioning device 61 is integrated in the transportation means 2. In order to reduce transport volume when shipping the transport assembly 10 empty the containers 4 are provided with a base and four foldable side walls so that they may be collapsed when having no content. It will in this way be possible to ship a plurality of containers 4 in a collapsed state, a plurality of lids 5 and possibly a plurality of transportation means 1 which are assembled as a unit kept together by means of the tensional strap 6 during empty return transport of said containers 4. The transport assembly 10 may alternatively be secured from unauthorized tampering by means of providing the transportation means 1, the containers 4 and the lid 5 with one or more seals.

The lid 5 is provided with receiving means which are intended to receive the wheels 3 of a second transportation means 1 of a second transport assembly 10 stacked on top of a first transportation means 1 so that a plurality of such transport assemblies 10 may be stacked, and fixated horizontally, one on top of the other. The upper surface 54 of the lid 5 is provided with two parallel narrow long side channels 55 of the lid 5 stretching from one short side of the lid to the other. The long side channels 55 of the lid 5 is placed at a distance from each other which is mainly equal to the distance between the wheels 3, as seen from a short side 22. The transportation means 1 may hereby be placed on top of the lid 5 by rolling it into engagement with the lid 5 in a lengthways direction. The long side channels 55 of the lid 5 are provided with channel stoppers 55" of the lid 5 placed at a distance from each of the short side ends of the long side channels 55 of the lid 5. This distance is adapted to the radius of the wheels 3 so that a wheel 3 is prevented from moving inwards in. the long side channel 55 of the lid 5. Inner channel stoppers 55" of the lid 5 are placed at a position corresponding to the vertical swiveling axis of the swivel castor wheels 3'. The lid 5 is provided with protrusions 56 intended to interact with upper side wall edges of the containers 4. This interaction resulting in stabilizing a stack of containers. This stabilizing effect is specially noted when the base area of the containers 2 are ¼ the area of the transportation means 2, meaning that the stack of containers consist of four towers of containers 4 arranged close together. The lid 5 will here keep the containers 4 together.

The invention is not limited to the embodiments shown, since it can be varied in different ways within the scope of the invention.

The invention claimed is:

1. Transport assembly comprising a transportation means which comprises a pallet-like carrying structure having two long sides, two short sides, four corners, an upper surface and a lower surface, that the carrying structure is provided with wheels at each of the four corners of which at least two of the wheels are of the swivel caster wheel type, that the upper surface furthermore is provided with receiving means which are configured to receive the wheels of second transportation means stacked on top of a first transportation means so that a number of such transportation means maybe stacked, and fixated horizontally, one on top of the other, the upper surface being provided with two narrow long side channels arranged parallel to the long sides and stretching from one short side to the other, the long side channels being arranged at a distance from each other which is mainly equal to the distance between the wheels, as seen from a short side, wherein transportation means may be arranged one on top of the other by rolling them into engagement with each other in a lengthwise direction wherein the transport assembly further comprises a plurality of containers stacked on top of the transportation means and a lid applied on top of the stack of containers, wherein the lid is provided with receiving means which are configured to receive the wheels of a second transportation means of a second transport assembly stacked on top of a first transportation means so that a plurality of such transport assemblies may be stacked, and fixated horizontally, one on top of the other, an upper surface of the lid being provided with two parallel narrow long side channels of the lid stretching from one short side of the lid to the other, the long side channels of the lid being arranged at a distance from each other which is mainly equal to the distance between the wheels, as seen from a short side, wherein transportation means may be arranged on top of the lid by rolling it into engagement with the lid in a lengthwise direction.

2. Transport assembly according to claim 1, wherein the stack of containers and the lid secured to the transportation means by means of tensional straps.

3. Transport assembly according to claim 1 wherein the containers are provided with a base and four foldable side walls.

4. Transport assembly according to claim 1 wherein the long side channels of the lid are provided with channel stoppers of the lid placed at a distance from each of the short side ends of the long side channels of the lid, which distance is adapted to the radius of the wheels so that a wheel is prevented from moving inwards or outwards in the long side channel of the lid.

5. Transport assembly according to claim 1 wherein inner channel stoppers of the lid are placed at a position corresponding to the vertical swiveling axis of the swivel caster wheels.

6. Transport assembly according to claim 1 wherein the lid is on its lower side provided with protrusions intended to interact with upper side wall edges of the containers, said interaction resulting in stabilizing a stack of containers.

7. Transport containers according to claim 2, wherein the tensional strap comprises a strap and a tensioning device, said tensioning device being integrated in the transportation means.

\* \* \* \* \*